United States Patent
Konno

(10) Patent No.: US 7,692,695 B2
(45) Date of Patent: Apr. 6, 2010

(54) IMAGING APPARATUS AND CONTROL METHOD THEREFOR

(75) Inventor: Georgero Konno, Kanagawa (JP)

(73) Assignee: Sony Corporation, Tokyo (JP)

( * ) Notice: Subject to any disclaimer, the term of this patent is extended or adjusted under 35 U.S.C. 154(b) by 461 days.

(21) Appl. No.: 11/704,109

(22) Filed: Feb. 8, 2007

(65) Prior Publication Data

US 2007/0188609 A1 Aug. 16, 2007

(30) Foreign Application Priority Data

Feb. 10, 2006 (JP) ............................ P2006-034286

(51) Int. Cl.
*H04N 5/76* (2006.01)
(52) U.S. Cl. ............... 348/231.1; 348/231.2; 348/231.3
(58) Field of Classification Search .............. 348/14.12, 348/14.13, 143, 231.99, 231.1–231.9; 382/302–308; 707/205
See application file for complete search history.

(56) References Cited

U.S. PATENT DOCUMENTS

| | | | | |
|---|---|---|---|---|
| 5,689,442 | A * | 11/1997 | Swanson et al. | ............ 380/241 |
| 6,943,833 | B1 * | 9/2005 | Kuniba et al. | ............ 348/231.1 |
| 7,098,947 | B2 * | 8/2006 | Iwauchi | .................... 348/231.1 |
| 2005/0271251 | A1 * | 12/2005 | Russell et al. | ................ 382/103 |
| 2006/0119714 | A1 * | 6/2006 | Tamura et al. | ......... 348/240.99 |

FOREIGN PATENT DOCUMENTS

| JP | 10 304310 | 11/1998 |
|---|---|---|
| JP | 10 341394 | 12/1998 |
| JP | 2001 94935 | 4/2001 |
| JP | 2001 339686 | 12/2001 |
| JP | 2004 128899 | 4/2004 |

\* cited by examiner

*Primary Examiner*—Tuan Ho
*Assistant Examiner*—Don Nguyen
(74) *Attorney, Agent, or Firm*—Frommer Lawrence & Haug LLP; William S. Frommer; Thomas F. Presson

(57) ABSTRACT

An imaging apparatus includes an image creating section for imaging a predetermined surveillance range and creating image data, and a storage processing section converting the image data to a predetermined storage format and creating storage data. A data storage section having a storage medium with a predetermined storage space stores the storage data created by the storage processing section. The apparatus includes a compression processing section for reading storage data stored in the data storage section, and compressing the storage data and creating compressed data. A determination processing section detects the data storage amount of the storage data stored in the data storage section, supplies a compression control signal to the compression processing section in accordance with the detection result and supplies the storage control signal to the data storage section.

2 Claims, 3 Drawing Sheets

IMAGING APPARATUS AND CONTROL METHOD THEREFOR

CROSS REFERENCES TO RELATED APPLICATIONS

The present invention contains subject matter related to Japanese Patent Application JP 2006-034286 filed in the Japanese Patent Office on Feb. 10, 2006, the entire contents of which being incorporated herein by reference.

BACKGROUND OF THE INVENTION

1. Field of the Invention

The present invention relates to an imaging apparatus that images a predetermined surveillance range and detects a subject under surveillance and a control method therefor.

2. Description of the Related Art

A surveillance camera is placed in various places in order to monitor a suspicious person, for example, in various surveillance ranges. Some surveillance cameras in the past may include a storage medium and select and store a necessary image data from imaged images onto the storage medium.

JP-A-2004-128899 (Patent Document 1) discloses a surveillance camera system that can image a person entering/exiting to/from the entrance with a least amount of storage by detecting the person entering/exiting to/from the entrance by a sensor provided at the entrance, supplying the detection signal to a camera, imaging the entrance by the camera in accordance with the detection signal and recording the imaged image.

SUMMARY OF THE INVENTION

However, because of the limited storage space, the storage medium of a surveillance camera may not store image data when the storable space is no longer available. In the surveillance camera in this case, an image of a suspicious person having broken into a surveillance range, for example, which may be highly required to store, is imaged, but the shot image is discarded without storing on a storage medium. Therefore, necessary images may not be stored.

Accordingly, it is desirable to propose an imaging apparatus that can securely store a necessary image for a surveillance activity even by using a surveillance camera including a storage medium having a predetermined storage space and a control method for an imaging apparatus.

According to an embodiment of the present invention, there is provided an imaging apparatus including an image creating section imaging a predetermined surveillance range and creating image data, a storage processing section converting the image data to a predetermined storage format and creating storage data, a data storage section having a storage medium with a predetermined storage space and storing the storage data created by the storage processing section, a compression processing section reading storage data stored in the data storage section, compressing the storage data and creating compressed data, and a determination processing section detecting the data storage amount of the storage data stored in the data storage section, supplying a compression control signal to the compression processing section in accordance with the detection result and supplying the storage control signal to the data storage section. In this case, the determination processing section detects the storage data amount in the data storage section and supplies the compression control signal to the compression processing section and supplies the storage control signal to the data storage section if it is determined that the detected storage data amount is larger than a predetermined amount. The compression processing section reads the storage data from the data storage section in accordance with the compression control signal supplied from the determination processing section and creates and supplies the compressed data from the storage data to the data storage section. The data storage section deletes the storage data read by the compression processing section in accordance with the storage control signal supplied from the determination processing section and stores the compressed data supplied from the compression processing section.

According to an embodiment of the invention, there is provided a control method for an imaging apparatus that images a predetermined surveillance range and stores the imaged image on a predetermined storage medium, the method including the steps of imaging the surveillance range and creating image data, converting the created image data to a predetermined storage format, storing the converted storage data to the storage medium, detecting the storage data amount of the storage data stored on the storage medium, determining whether the detected storage data amount is larger than a predetermined amount or not, reading the storage data from the storage medium if the detected storage data amount is larger than the predetermined amount, deleting the read storage data from the storage medium, compressing the read storage data, and storing the compressed data on the storage medium.

According to the embodiments of the invention, the stored data amount of the storage data stored on the storage medium is detected, and whether the detected stored data amount is larger than a predetermined amount or not is determined. In accordance with the determination result, the stored data is compressed, and the compressed data is stored on the storage medium.

Thus, according to the embodiments of the invention, even when the storable data space of the storage medium gets smaller, the storage data already stored on the storage medium may be compressed and re-stored. Thus, the storage data space of the storage medium can be increased, and image data necessary for a surveillance activity can be securely stored on the increased storable data space.

DESCRIPTION OF THE PREFERRED EMBODIMENTS

Referring to drawings, a specific embodiment according to the invention will be described in detail below.

Figure 1:
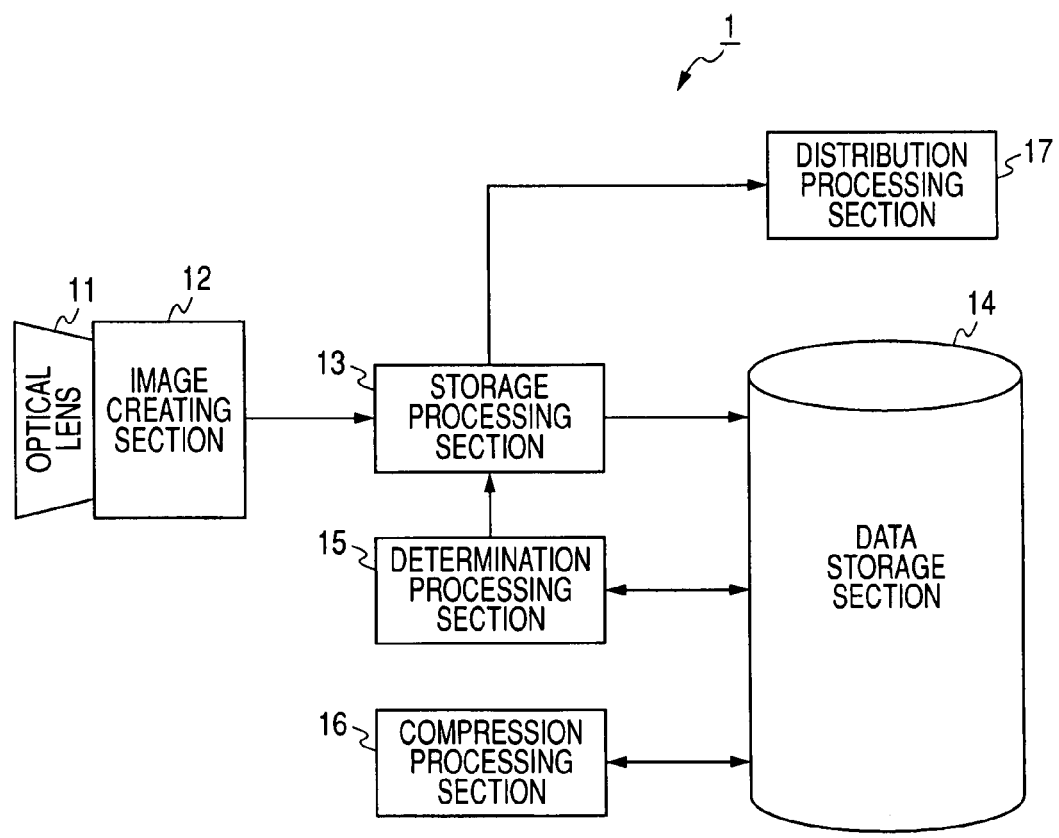
FIG. 1 is a block diagram showing a construction of a surveillance camera.

As shown in FIG. 1, a surveillance camera includes an optical lens 11, an image creating section 12, a storage processing section 13, a data storage section 14, a determination processing section 15, a compression processing section 16 and a distribution processing section 17.

The image creating section 12 creates image data from a subject within a surveillance range captured by the optical lens 11 and supplies the image data to the image processing section 13. More specifically, the image creating section 12 creates image data by performing processing such as contrast adjustment, gamma correction, edge correction and frame interpolation on an imaged image.

The storage processing section 13 first determines whether the image data supplied from the image creating section 12 is to be stored or not. Then, the storage processing section 13 creates storage data based on a predetermined storage format from the image data determined to store. More specifically, the storage data is created by performing encoding processing based on predetermined codec specifications on image data. On the other hand, the storage processing section 13 deletes image data determined not to store. Here, the image to be stored may be image data having a moving object. A priority indicating the degree of necessity may also be given to storage data. After that, the storage processing section 13 supplies the storage data to the data storage section 14 and the distribution processing section 17.

The data storage section 14 includes a storage medium having a predetermined storage space and stores storage data supplied from the storage processing section 13.

The determination processing section 15 detects the stored data amount stored in the data storage section 14. In accordance with the detection result, the determination processing section 15 supplies a storage control signal to the data storage section 14 and supplies a compression control signal to the compression processing section 16. More specifically, the determination processing section 15 determines whether the stored data amount is larger than a preset and predetermined threshold value or not from the detection result of the stored data amount stored in the data storage section 14.

The compression processing section 16 reads the storage data stored in the data storage section 14 in accordance with the compression control signal supplied from the determination processing section 15. Then, the compression processing section 16 compresses the storage data and creates compressed storage data. Then, the compression processing section 16 supplies the compressed storage data to the data storage section 14.

The distribution processing section 17 converts the storage data supplied from the storage processing section 13 to predetermined communication specifications and distributes the image data to another information apparatus via a communication unit such as a communication cable and wireless communication.

Figure 2:
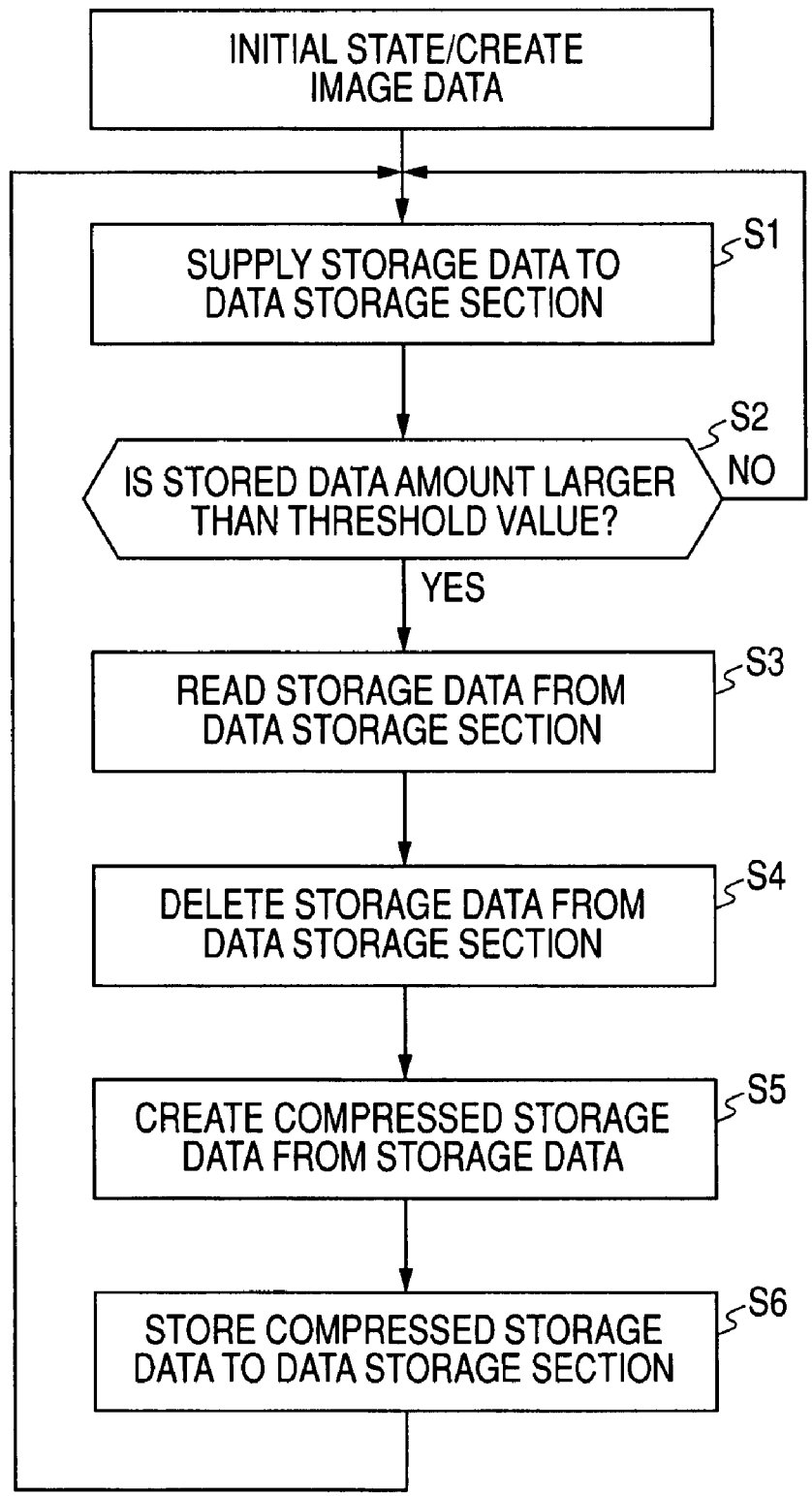
FIG. 2 is a flowchart showing re-storage processing to be performed by a determination processing section mainly.

Next, referring to FIG. 2, the re-storage processing on image data to be performed by the determination processing section 15 mainly will be described in detail.

First, before main processing steps, image data is created by the image creating section 12, and the image data is supplied to the storage processing section 13.

In step S1, the determination processing section 15 causes the storage processing section 13 to create storage data from the image data supplied from the image creating section 12 and supply the storage data to the data storage section 14. The data storage section 14 stores the storage data supplied from the storage processing section 13.

In step S2, the determination processing section 15 detects the stored data amount stored in the data storage section 14 and determines whether the stored data amount is larger than a predetermined threshold value or not. The determination processing section 15 moves to step S3 if it is determined that the stored data amount is larger than the predetermined threshold value. The determination processing section 15 returns to step S1 if it is determined that the stored data amount is not larger than the predetermined threshold value.

In step S3, the determination processing section 15 supplies a compression control signal to the compression processing section 16. The compression processing section 16 reads storage data from the data storage section 14 in accordance with a control command based on the compression control signal supplied from the determination processing section 15. Upon completion of the reading of storage data, the compression processing section 16 supplies a completion-confirmed signal to the determination processing section 15.

In step S4, the determination processing section 15 supplies a storage control signal to the data storage section 14 when the completion-confirmed signal is supplied thereto from the compression processing section 16. The data storage section 14 deletes the storage data read to the compression processing section 16 in accordance with the control command based on the storage control signal supplied from the determination processing section 15.

In step S5, in accordance with the control command based on the compressed control signal, the compression processing section 16 compresses the storage data read from the data storage section 14 and creates compressed storage data. The specific processing of creating compressed storage data will be described later.

In step S6, in accordance with the control command based on the compression control signal, the compression processing section 16 supplies the compressed storage data to the data storage section 14. On the other hand, the data storage section 14 stores the compressed storage data supplied from the compression processing section 16. After that, the main processing returns to step S1.

Next, the compression processing to be performed by the compression processing section 16 in step S5 will be described more specifically. First, the compression processing is divided into two cases based on whether encoding processing based on predetermined codec specifications has been performed on the storage data created by the storage processing section 13 or not.

The compression processing for the storage data having undergone the encoding processing includes three of frame thinning-out processing of removing an unnecessary frame from storage data, pixel thinning-out processing of reducing the resolution of the image of storage data to reduce the data amount and encoding compression processing of performing encoding processing on storage data to reduce the data amount.

The compression processing for the storage data not having undergone the encoding processing includes performing decoding processing on storage data and performing encoding processing thereon again at a high compression rate. When the storage data has a data format in which information of image data is encoded hierarchically, like JPEG2000, the compression processing includes extracting a low quality part only without decoding to reduce the data amount.

When an accessory image priority is given to storage data created by the storage processing section 13, the data amount of the storage data is reduced in accordance with the priority, and the compressed storage data is created. More specifically, the priority is an indicator to be given to each frame or GOP (Group of Picture) in accordance with whether a given imaged image has a subject under surveillance such as a moving object or not. In this case, the compression processing deletes the storage data in frames or GOPs in accordance with the priority.

In this way, the compression processing section 16 performs the compression processing steps exclusively or a combination of the compression processing steps in accordance with the data format of storage data. In particular, if storage data is in JPEG2000, the data amount can be reduced easily without performing decoding processing.

The processing steps by the surveillance camera 1 for actually implementing the re-storage processing will be described.

The optical lens 11 and image creating section 12 are included in a camera block 21. The camera block 21 is included in a general imaging apparatus.

A computing processor 22 is hardware that implements the processing by the storage processing section 13, determination processing section 15 and compression processing section 16. The computing processor 22 includes a RAM 22a that temporarily stores storage data and compressed data.

A storage device 23 stores an imaged image and is implemented by a hard disk drive that can store a larger amount of data specifically.

Figure 3A:
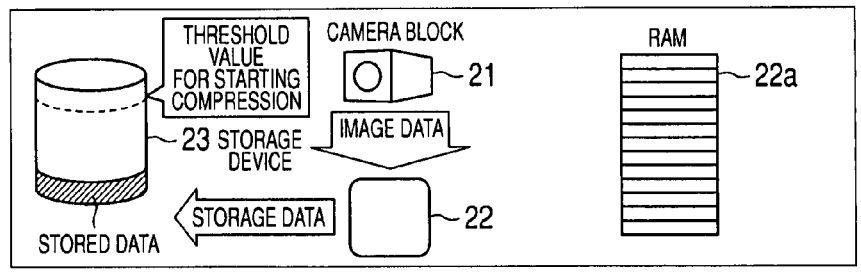
FIGS. 3A to 3F are schematic diagrams showing processing steps to be performed by the actual surveillance camera.

In FIG. 3A, the computing processor 22 converts image data created by the camera block 21 to storage data and stores the storage data in the storage device 23.

Figure 3B:
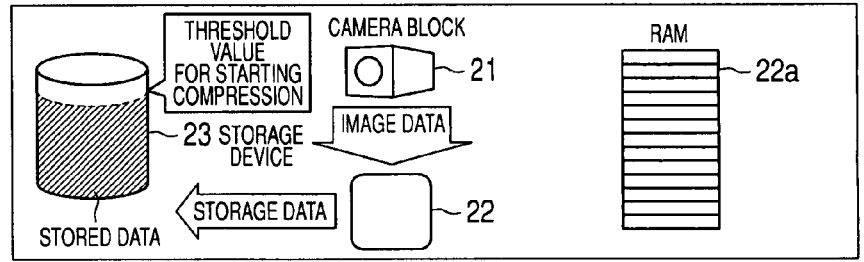

In FIG. 3B, the computing processor 22 determines whether the stored data amount of the storage device 23 is larger than a predetermined threshold value or not and starts compression processing on the storage data.

Figure 3C:
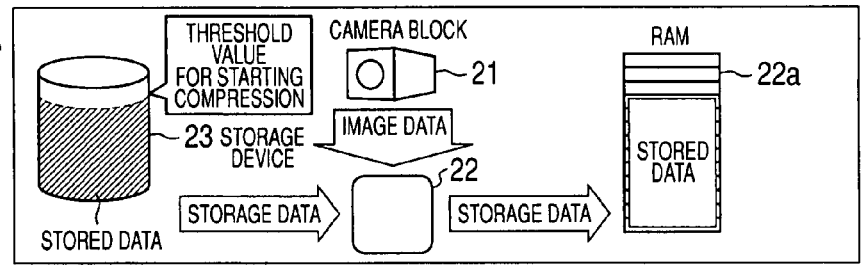

In FIG. 3C, the computing processor 22 supplies the storage data stored in the storage device 23 to the RAM 22a.

Figure 3D:
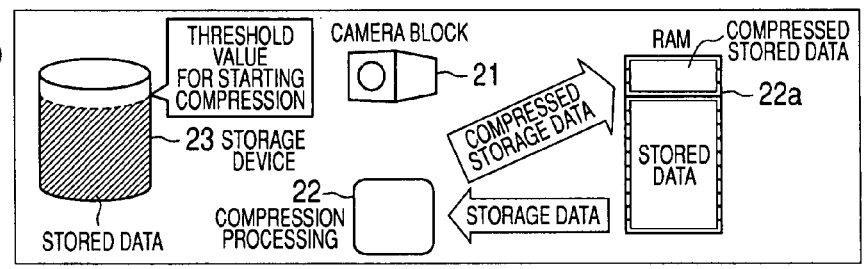

In FIG. 3D, the computing processor 22 reads and performs compression processing on the storage data stored in the RAM 22a and causes the RAM 22a to store the compressed storage data.

Figure 3E:
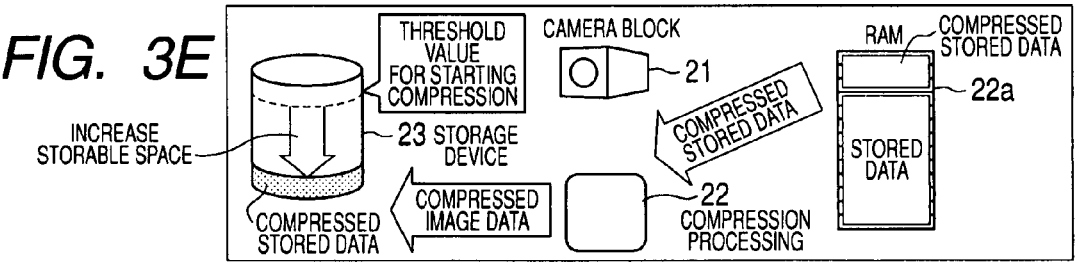

In FIG. 3E, the computing processor 22 reads and supplies the compressed storage data stored in the RAM 22a and causes the storage device 23 to store the compressed storage data.

Figure 3F:
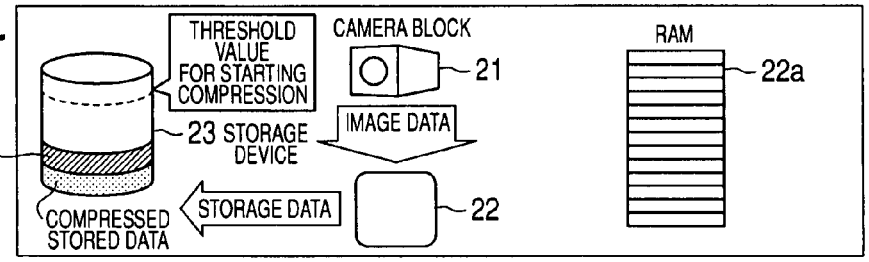

In FIG. 3F, the computing processor 22 causes the storage device 23 to store storage data until the stored data amount of the storage device 23 excesses the predetermined threshold value as in FIG. 3A.

As described above, in the surveillance camera 1, the determination processing section 15 detects the stored data amount of the data storage section 14 and compresses storage data stored in the data storage section 14 based on the detection result. Thus, the storable data space can be increased, and image data with a higher priority can be stored on a priority basis. Therefore, important image data can be securely stored.

If a surveillance camera in the past is used when imaged data may not be distributed through a predetermined communication unit and if the data storage space of a storage medium provided in the surveillance camera is no longer available, images imaged thereafter may not be stored. However, the surveillance camera 1 according to this embodiment can securely store a necessary image within the data storage section 14 since the storable data space of the data storage section 14 is increased by the compression of storage data.

Furthermore, as shown in FIGS. 3A to 3F, the surveillance camera 1 according to this embodiment includes the existing camera block 21, the computing processor 22 that performs predetermined processing, and the storage device 23 such as a hard disk drive. Therefore, the surveillance camera that performs the compression processing can be designed and implemented easily.

The invention is not limited to the embodiment above, but various changes may be made thereto without departing from the spirit and scope of the invention.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:

an image creating section for imaging a predetermined surveillance range and creating image data;

a storage processing section for converting the image data to a predetermined storage format and creating storage data;

a data storage section having a storage medium with a predetermined storage space and storing the storage data created by the storage processing section;

a compression processing section for reading storage data stored in the data storage section, compressing the storage data and creating compressed data; and a determination processing section for detecting a data storage amount of the storage data stored in the data storage section, supplying a compression control signal to the compression processing section in accordance with the detection result and supplying the storage control signal to the data storage section, wherein the determination processing section detects the storage data amount in the data storage section and supplies the compression control signal to the compression processing section and supplies the storage control signal to the data storage section if it is determined that the detected storage data amount is larger than a predetermined amount;

the compression processing section reads the storage data from the data storage section in accordance with the compression control signal supplied from the determination processing section and creates and supplies the compressed data from the storage data to the data storage section; and the data storage section deletes the storage data read by the compression processing section in accordance with the storage control signal supplied from the determination processing section and stores the compressed data supplied from the compression processing section.

2. A control method for an imaging apparatus that images a predetermined surveillance range and stores the imaged image on a predetermined storage medium, the method comprising the steps of:

imaging the surveillance range and creating image data;

converting the created image data to a predetermined storage format;

storing the converted storage data to the storage medium;

detecting a storage data amount of the storage data stored on the storage medium;

determining whether or not the detected storage data amount is larger than a predetermined amount;

reading the storage data from the storage medium if the detected storage data amount is larger than the predetermined amount;

deleting the read storage data from the storage medium;

compressing the read storage data; and storing the compressed data on the storage medium.

* * * * *